Patented Apr. 15, 1947

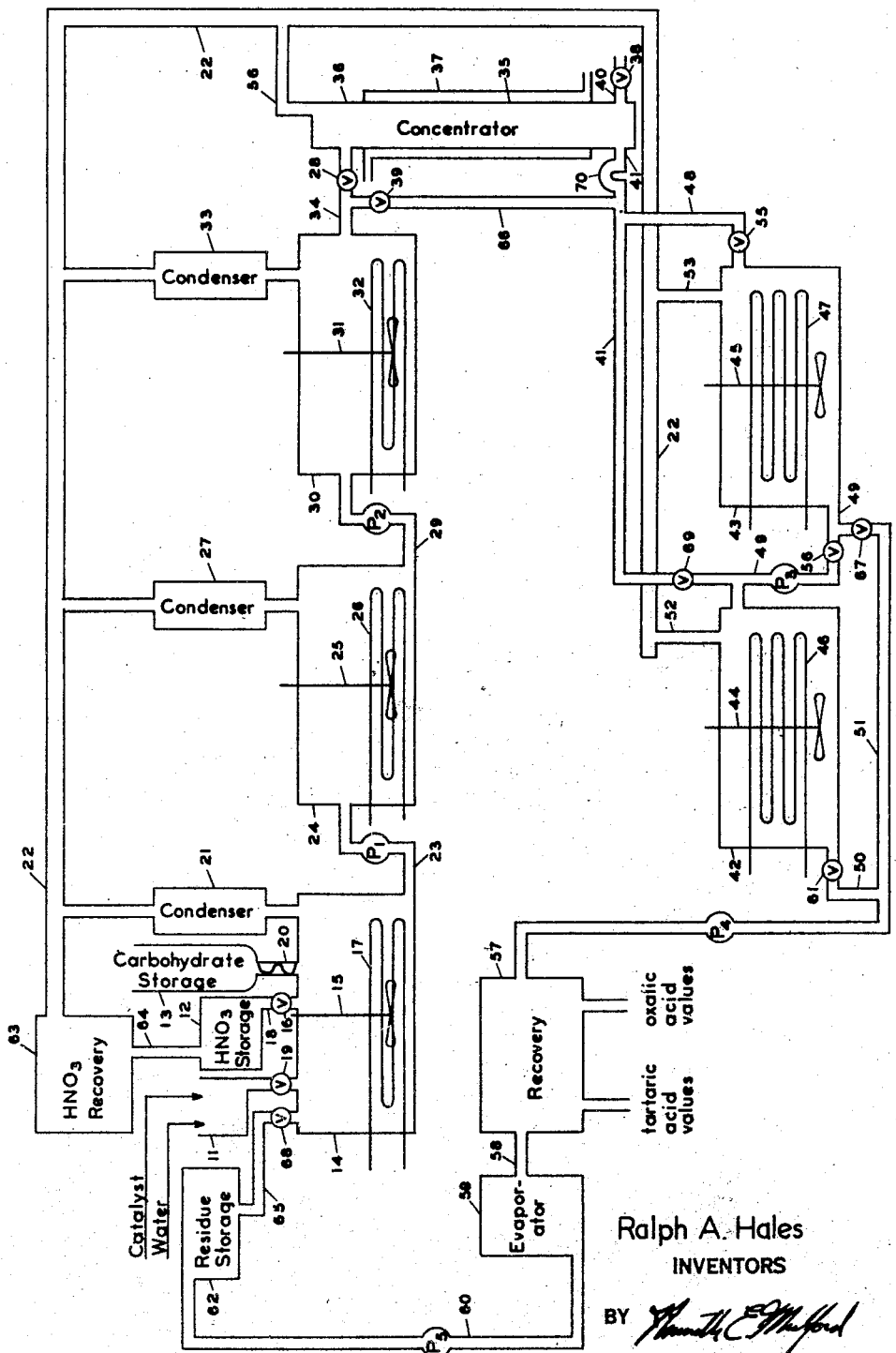

2,419,019

UNITED STATES PATENT OFFICE 2,419,019

CONTINUOUS PROCESS FOR OXIDIZING CARBOHYDRATES TO TARTARIC ACID

Ralph A. Hales, West Chester, Pa., assignor to Atlas Powder Company, Wilmington, Del., a corporation of Delaware Application October 23, 1944, Serial No. 560,022

2 Claims. (Cl. 260—528)

The present invention relates to the nitric acid oxidation of carbohydrate materials to produce valuable acid values and in particular to the oxidation of glucose-containing materials to produce tartaric and oxalic acid values.

An object of the invention is to provide a more efficient and economical process for oxidizing carbohydrate materials, particularly glucose or polysaccharides capable of yielding glucose rapidly on hydrolysis, to the industrially valuable tartaric and oxalic acids.

A further object of the invention is to provide a process for obtaining high tartaric and oxalic acid value yields from carbohydrate material with relatively small carbon loss in the form of other products.

Another object is to provide a rapid process for the production of tartaric and oxalic acid values.

Other objects will become apparent from the following description.

The nitric acid oxidation of carbohydrate materials to produce high yields of tartaric and oxalic acids is inherently a difficult problem. The carbon chain of the carbohydrate materials must be selectively cut so as to leave a portion oxidizable to tartaric acid. To get d-tartaric acid, at present the most desirable of the tartaric acids, from the carbohydrate, d-glucose, the gluconic chain must be cut between the 4 and 5 carbon atoms into a 4-carbon and a 2-carbon fragment. Then the larger portion must oxidize to tartaric acid and the smaller portion to oxalic acid, thus:

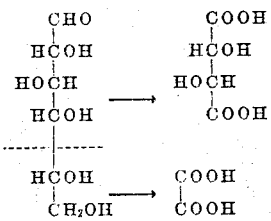

In practice, however, the oxidative decomposition of glucose by nitric acid can follow several paths. The primary oxidation products seem to be gluconic and saccharic acids, but 2 and 5-ketogluconic acids can occur. These acids in turn can be broken down to give 5-carbon and 3-carbon acids in addition to the 4-carbon acids, meso- and d-tartaric acids and the 2-carbon acid, oxalic acid. Since all of the intermediates containing 2 or more carbon atoms can be oxidized further to oxalic acid and carbon dioxide, the latter are usually the chief products of the reaction in the absence of special catalysts and if the reaction is sufficiently vigorous.

The oxidation products differ in their resistance to nitric acid under different conditions. Tartaric acid is ordinarily one of the more easily attacked oxidation products. In the presence of properly directive catalysts, however, tartaric acid can be produced under proper conditions. Accordingly, the catalytic nitric acid oxidation of glucose to produce tartaric acid commonly yields a mixture containing principally tartaric and oxalic acids, and a residue of less highly oxidized acids, and carbon dioxide. The amount of tartaric acid which survives depends upon its stability compared with residue acids under the conditions used.

As an oxidizing agent nitric acid possesses the advantages of cheapness and regenerability, but its action depends upon a complex decomposition to nitrous acid and oxides of nitrogen which are evolved from the reaction so that the oxidizing power varies continually and in a manner very difficult of exact control throughout the period of use. The autocatalytic nature of its reaction with carbohydrate and other polyhydroxylic material likewise makes control of temperature and concentration difficult to achieve.

The economic practicability of the process depends to a considerable extent on the recovery of the nitrogen in a form such that it can be regenerated, for example, by air oxidation, to nitric acid. To be regenerable the evolved nitrogen gases should be reduced to a stage no lower than NO. The oxide, $N_2O$, and elemental nitrogen, $N_2$, are not readily convertible.

Thus it is seen that the reaction is one of oxidation and reduction in which both the oxidation and the reduction proceed complexly by stages and through a succession of products, and both the oxidation and the reduction should be stopped before their completion.

According to this invention a process has been devised which is more efficient, subject to better control, and more economical than previously known processes for making tartaric acid from carbohydrate material.

For starting materials in the process of this invention, there may be used water-soluble carbohydrate materials oxidizable in solution by nitric acid to tartaric acid. By the term "carbohydrate material" is meant to be included not only compounds containing hydrogen and oxygen in the proportions of water, but also other polyhydroxylic materials, such as hexitols, pentitols, erythritol, sugar acids, including aldehydic and ketonic acids, other similar materials and materials readily hydrolyzable to these. Such materials are commonly classed as carbohydrates. Most hexoses, such as fructose or mannose and particularly d-glucose which is available in pure form, free from ash, of constant composition, and at a low price, are readily usable in my process. Carbohydrate materials readily hydrolyzable by acid to other starting materials are equivalent to those materials. Among such materials are included oligo- or polysaccharides, such as starch, dextrine, corn syrup, sucrose and high test molasses (partially inverted raw cane sugar) which readily hydrolyze to hexoses. Butadiene dioxide which hydrolyzes readily to erythritol may also be used in this process. An available and advantageous group of starting materials is that composed of glucose, fructose, pentoses, gluconic acid, erythritol, ketogluconic acids and materials which rapidly hydrolyze to these. A material which cannot be used and which is excluded from this invention is galactose which oxidizes to insoluble mucic acid, nor can be used and, hence, are excluded other carbohydrates which oxidize to insoluble intermediate products for insolubles are not practically further oxidizable in this reaction.

Nitric acid oxidizing agent may be introduced into the reaction mixture as such, in which case it is preferred that it contain a little lower oxide of nitrogen which appears to act catalytically toward the reaction; or it may be formed in situ by passing into the reaction mixture a mixture of oxidizable nitrogen oxides and air or other oxygen-containing gas, or by introduction of higher oxides of nitrogen which have been formed outside the reaction mixture. In this specification and claims by the term "introducing nitric acid" is meant its introduction by any of these methods.

The reaction requires a catalyst to give a practical yield of tartaric acid. Any oxidation catalyst directive for tartaric acid production, a number of which are known in the art, can be used. Various polyvalent metal compounds are operative for this purpose, including compounds of vanadium, manganese, iron and molybdenum. Vanadium in the form of its soluble pentavalent compounds such as sodium orthovanadate hexadecahydrate ($Na_3VO_4.16H_2O$) is a most efficient catalyst and is preferred.

The gases evolved from the reaction usually contain somewhat less than 10% nonrecoverable nitrogen as $N_2$ or $N_3O$ and the remaining oxides of nitrogen can be converted to nitric acid without particular purification either at atmospheric pressure or after compression as, for example, to the customary 6-7 atmospheres; or they may be oxidized and absorbed in the reaction mixture.

At the start, the reaction usually takes place with considerable violence and requires strenuous cooling to keep it under control. As the reactants become used up and more diluted the reaction moderates so that, as a rule, heating eventually becomes necessary to make it continue at a reasonable rate. The reaction does not appear to proceed uniformly as a whole through different compounds of successively greater degree of oxidation, but rather a number of different products and intermediates exist together. Unduly high temperatures in the reaction are disadvantageous. At the beginning of the reaction they permit it to get out of hand and proceed to undesirable materials, such as carbon dioxide, and later on tend to destroy desired product which has been formed and which it is desired to retain while further quantities are produced. Particularly is this decomposition true of oxalic acid. However, in order to permit the reaction to proceed at a reasonable rate, it is necessary that it be performed at somewhat elevated temperatures.

It is probable that during the reaction nitrogen esters are formed in the solution and that the final products are largely released from such esters with evolution of the lower nitrogen oxides formed in the process. In any event the presence of nitrogen compounds interferes with recovery of tartaric acid. Hence, it is desirable to complete the reduction to lower and volatile oxides of nitrogen before attempting product separation. However, as the reaction progresses, and the reactants become less concentrated and less reactive, oxidation slows down. It then becomes necessary to heat the reactants higher than is desirable from the standpoint of stability of product to complete evolution of nitrogen oxides in a practicable time. One method of procedure which has been found desirable is to conduct the reaction in a plurality of stages; first at lower temperatures and finally at higher temperatures to complete oxide of nitrogen evolution. The first or main part of the reaction which is called the blow period is largely exothermic and is preferably conducted at 60 to 80° C. While temperatures outside this range may be employed, higher temperatures, as has been mentioned above, may tend to destroy the product and produce losses while too low temperatures are apt to unduly prolong the reaction. The last period which is called the fume-off stage is desirably conducted at 90 to 100° C.; though again temperatures outside this range are permissible. While there may be a multiplicity of stages from low to high temperatures, it has been found that two stages, a blow stage in the lower range and most preferably at about 70° C. and a fume-off stage in the higher range and preferably at about 95° C., are often entirely satisfactory.

Efficient nitric acid recovery is essential to the economics of the process. However, with the rate of reaction of any given quantity of reactants decreasing as the concentration of fresh materials diminishes, the flow of evolving oxides of nitrogen also falls off. Yet, efficient operation of nitric acid recovery equipment requires a relatively constant flow of oxides of nitrogen. It has been found that this condition of varying flow of oxides of nitrogen can be eliminated if reactants are continuously added to a reaction vessel at a uniform rate and product is continuously removed. In this way the reaction is constantly augmented by fresh reactants and spent reactants are continuously removed. Relatively constant conditions of reaction and evolution of oxides of nitrogen result.

Since at least two temperature zones are desirable for the reaction, it is preferred in the case of continuous reaction to run the reacting solution through a succession of at least two temperature zones, one corresponding to the blow period and another corresponding to the fume-off period. The major evolution of oxides of nitrogen takes place in the blow period, and for this reason it may be desirable to operate only that one continuously. If the reactants are continuously passed through a zone corresponding to the blow period, the holding time in that zone should be such that completion of the blow reaction takes place there. Much improved mixing of reactants and more efficient and constant reaction may be obtained if, instead of one zone, a plurality of successive zones are employed for the blow. Then the holding time in each zone should be smaller, and reactants are mixed in each zone. As exemplary of one embodiment of this invention, the blow period may be conveniently broken up into three reaction zones arranged in a series. The fume-off period may also be conducted continuously in a similar manner or it may be conducted in batch fashion.

The flow need not be absolutely uniform or continuous to and/or from the reaction; it may be fluctuating or intermittent. It is only necessary that, for the best use of nitrogen recovery equipment, the flow be in such a manner that a variation of oxides of nitrogen evolution of no more than about 25% and preferably no more than 5% is obtained. In case of intermittent feed, this requires only that the ratio of the zone size to each injection of rectants be such that a sufficiently constant flow of oxides of nitrogen is obtained.

It has been found that reaction times may be very considerably shortened and product recoveries materially increased if the reaction solution is concentrated before its completion but after the violence of the blow has moderated. In this way subsequent reaction may take place under more concentrated conditions and, hence, more rapidly. Desirably, the reaction liquor may be concentrated prior to the fume-off period. As has been mentioned above, the fume-off period is often both tedious due to the dilution of the reactants at that stage and wasteful of product because of the relatively high temperatures employed, which result in product decomposition during its long duration. Concentration prior to fume-off makes that period much shorter and increases yields of product. Concentration may be effected by heating the reaction solution under conditions of high surface exposure to evaporate off water. One method of concentrating, which has been found satisfactory, is accomplished by passing reacting solution emerging from the blow stages of reaction in a film through a heated tower. Concentration itself may entail the use of higher temperatures than would otherwise be used in the reaction, but if the surface exposure of the reaction solution is sufficient, enough evaporation may be completed in a short enough time that the reaction may then be completed under normal fume-off conditions much more rapidly and with less product decomposition overall. Film-type concentration in a heated tower may be aided by the use of counter-current flow of a carrier gas. A carrier gas is more efficient if it is dry and, desirably, it may also contain lower oxides of nitrogen. Lower oxides of nitrogen are products of the decomposition of nitric acid and are dissolved in the reaction solution. They appear to act catalytically and aid the reaction. By a partial pressure effect, lower nitrogen oxides used as a carrier gas aid removal of water and tend to keep the dissolved nitrogen oxides in the solution so that they may perform their catalytic function in the fume-off reaction. Concentration may also be aided and lower temperature operation permitted by the imposition of a vacuum on the concentrating solution, but it is preferred, to prevent undue escape of the desirable nitrogen oxides, that too high a vacuum be not applied. Other rapid methods of concentration may also be employed, as for example, film type evaporation as is obtained with some of the long tube evaporators available commercially.

Sometimes fume-off and concentration steps may be combined as, for example, by bubbling air or other carrier gas through, or otherwise aerating, the solution undergoing fume-off. Or, on the other hand, the reaction may be completed in the concentration step. In general concentration should be effected after the blow has moderated.

The reaction may be carried out in any suitable apparatus. The drawing diagrammatically shows one type which has been found to be successful.

Catalyst from tank 11, where it is made up in water solution, is added by means of valve 19 to reaction chamber 14. Also added to chamber 14 are nitric acid from tank 12 by means of pipe 18 and valve 16, and carbohydrate material from hopper 13 by means of screw 20. Reaction chamber 14 which is a blow chamber is equipped with stirring device 15 and heat exchange coil 17. Reaction chamber 14 is also equipped with reflux condenser 21 which leads into oxide of nitrogen line 22. Reflux condenser 21 is arranged so that nitric acid fumes and water may be condensed and returned to reaction chamber 14. This is not a necessary feature but assists in the efficient use of acid.

From reaction chamber 14 which is maintained at the desired temperature by means of heat exchange coil 17, the reaction solution proceeds by pipe 23 and pump $P_1$ into reaction chamber 24 which is equipped similarly to chamber 14 with stirring apparatus 25, heat exchange coil 26, and reflux condenser 27 which also leads to main 22. Chamber 24 is another blow chamber.

From chamber 24, reaction solution flows through pipe 29 and pump $P_2$ into reaction chamber 30 which also is equipped with an agitator 31, heat exchange coil 32, and a reflux condenser 33 which leads into main 22. Chamber 30 is a third blow chamber.

From reaction chamber 30, solution flows through pipe 34 and valve 28 into a concentrator represented by numeral 35. As shown, the concentrator is made of a tube 36 which is jacketed by a steam chamber 37. Entering by pipe 34 reacting solution flows in a film down heated wall 36. Concentrator 35 is further equipped with an air inlet tube 40 controlled by valve 38 and an outlet line 41 containing a trap 70. Air inlet tube 40 provides a carrier gas which flows counter to solution flowing down tube 36. Trap 70 serves to maintain a small pool of liquid in the bottom of concentrator 35. Concentrator 35 also contains a vapor vent line 56 leading to conduit 22.

From concentrator 35, concentrated liquid flows through trapped pipe 41 into fume-off reaction chambers 42 and 43 which are equipped respectively with agitators 44 and 45 and heat exchange coils 46 and 47. If it is not desired to use the concentrator, it may be short circuited by means of line 66 and valve 39. These reaction chambers are used to perform the fume-off and may be operated either continuously in series or alternately in batch. If they are to be operated continuously in series, liquor flows from pipe 41 through pipe 48 and valve 55 into reaction chamber 43 and from there out through pipe 49 through valve 56 and pump $P_3$ into reaction chamber 42 and from there out through pipe 50 and valve 61 into product line 51. If these chambers are to be operated alternately in batch operation, valve 55 should be closed. Liquor will then pass through pipe 41 and valve 69, which is opened, into pipe 49 and into reaction chamber 42 until that chamber is full. Then valve 69 is closed and reaction liquor is passed through pipe 41 and valve 55 into reaction chamber 43. Before reaction chamber 43 is filled, fume-off reaction must be completed in chamber 42 and it must have been exhausted through line 50 and valve 61 into line 51. Valve 61 will then be closed as will also valve 55. While the fume-off is performed in chamber 43, valve 69 will be opened to admit a new charge into chamber 42. By the time filling of chamber 42 is completed chamber 43 must have been exhausted through line 49 and valve 67 into line 51. Then chamber 43 is filled while reaction is completed in chamber 42 and it is exhausted and so on. These fume-off chambers may also be connected for continuous parallel operation if desired. Chambers 42 and 43 are equipped with vapor lead-off lines 52 and 53 respectively which lead evolved gases to line 22.

From pipe 51 oxidized solution passes by means of pump $P_4$ to a recovery system represented generally at 57 from which tartaric acid values and oxalic acid values are obtained as well as a residue of partially oxidized material which is passed through pipe 58 to an evaporator preferably of the vacuum type, represented generally at 59 and from there through line 60 by means of pump $P_5$ to a storage chamber 62.

The nitrogen oxide fumes evolved from reaction chambers 14, 24 and 30, concentrator 35, and fume-off chambers 42 and 43 may be passed to any suitable nitric acid recovery system. Such systems are well known in the art and one is represented generally on the drawing as 63. From a nitric acid recovery system nitric acid may flow through pipe 64 to storage tank 12.

The residue contained in storage tank 62 is very advantageously used as a starting carbohydrate material. It may be led from storage tank 62 through pipe 65 and valve 66 into reaction vessel 14. Preferably, it is augmented with fresh carbohydrate material from hopper 13.

The use of residue as part of the starting material is highly advantageous for a number of reasons. Since it is already partially oxidized, it serves to temper the violent reactivity of the fresh reactants. Also, it makes for a great increase in economy of the process because of the use it makes of the potential product contained in the residue. Furthermore, when residue is recycled the process can be operated to obtain less product per cycle but more product overall. This is possible probably because as the reaction is performed that portion of the product which is at first formed is subject to destruction through further oxidation and decomposition while the remainder of it is being produced. If it is known that the residue will not be wasted, it is possible to perform less oxidation in each cycle and thereby decompose or destroy less product. Also, the use of residue in cyclic operation permits a greater constancy of operation, particularly if, as is preferred, the process is operated so that residue is added at approximately the same rate at which it is formed.

The nitric acid recovery system can operate efficiently in the process of the present invention because at all times relatively constant conditions are maintained in each of the blow reaction chambers and the oxides of nitrogen evolving from these chambers do so at a relatively constant rate. Batch operation of the fume-off stage is permissible along with continuous blow operation because of the relatively small evolution of nitrogen oxides in that stage.

Removal of product from the reacted solution may be performed in any desirable manner. Usually the greater part of the oxalic acid content may be crystallized as such by simple cooling. The remaining oxalic acid may then be removed in the form of zinc oxalate by the addition of a zinc salt, for example, basic zinc carbonate, and finally tartaric acids may be precipitated similarly in the form of zinc tartrates. Calcium or other salts which produce insoluble oxalates and tartrates also may some times be used for this purpose. Separation may also be accomplished by preparing volatile oxalic and tartaric esters which may be separated from one another by fractional distillation.

Control of certain of the reaction conditions, such as quantity of catalyst, quantity of acid, temperature, and rate of flow, is highly desirable. Proper conditions vary somewhat in dependence upon the particular carbohydrate material which is employed. Illustrative conditions which usually give best results with glucose are given below. Knowing these, suitable values for other specific materials can be ascertained. With the glucose starting material, sodium orthovanadate hexadecahydrate catalyst proportions should be approximately 0.01 to 0.03% of the fresh glucose. The quantity of acid used should depend upon the amount of residue employed. If no residue is used, a value between about 4 and 5 pounds of 100% $HNO_3$ per pound of total carbon in the glucose is desirable. When residue is used to the extent of about 0.5 to about 0.9 pound of residue carbon per pound of carbon in glucose, the desirable acid range will vary roughly inversely between about 4 and about 3 pounds of 100% $HNO_3$ per pound of total carbon. The carbon contents which determine these ratios may be readily determined by customary methods such as combustion analysis or wet methods, as for example, that taught by Pollard and Forsee, Industrial & Engineering Chemistry, Analytical Edition, vol. 7, p. 77 (1935). Water should be employed in quantities between about 30 and 70% of the weight of $HNO_3$ plus water employed. As has been stated previously, blow temperatures generally should run between about 60 and 80° C. and preferably about 70° C. The fume-off temperatures usually run to about 90 to 100° C. For best results, concentration temperature should not be much above the degree of temperature at which the solution boils at atmospheric pressure. Concentration should be continued for best results to a degree at least such that the reaction may be later completed in less than approximately one hour at 95° C. Under preferred conditions with the use of concentration, the blow period should last about two hours and the fume-off about one-half hour. The end of the fume-off period may be determined by the use of starch iodide indicator paper to test for oxides of nitrogen. These particular specific conditions are not necessary to the obtention of practical results. The use of them will, however, be found to give good yields.

It is not necessary that all additions of reactants take place in the first reaction chamber, but reactants may be added in part at later stages of the reaction. However, if this is done, specific preferred operation conditions may be somewhat different from those given above.

The following examples demonstrate certain embodiments of the invention.

*Example 1*

Apparatus similar to that diagrammatically shown in the drawings may be used in this example. Apparatus is set up so that chambers 14, 24 and 30 each hold 1.8 liters of reacting solution and may be operated in series as shown. In this example no residue is used with the reactants but only fresh glucose. Glucose is fed into chamber 14 at the rate of 697.3 grams per hour along with enough 55% nitric acid to provide 4.6 g. of $HNO_3$ for each gram of carbon in the glucose (this amounts to about 2330 g. of nitric acid solution per hour). Also fed into chamber 14 is sodium orthovanadate hexadecahydrate catalyst in an amount of 0.015% of $Na_3VO_4.16H_2O$ based on glucose employed. The total of materials so fed into the reaction vessel amounts to about 2.16 liters per hour of which approximately 1.05 liters are water. After passing successively through chambers 14, 24 and 30 each of which is maintained at about 70° C. the solution is run into concentrator 35. Concentrator 35 is a steam jacketed 4 foot length of chrome-steel pipe of 1½ inches inside diameter. The jacket is kept under 4 pounds per square inch gauge of wet steam, and air is passed in the bottom through line 40 and valve 38 at the rate of 0.6 cubic foot per minute. A small pool of liquid is maintained in the bottom of concentrator 35. From concentrator 35 the reaction solution passes through pipe 41 into fume-off chambers 42 and 43. These chambers may be operated alternately as described above and at about 95° C. The reacted solution in pipe 51 passes to recovery system 57. In recovery system 57 the reacted solution which contains about 35.8% of water is cooled to about 6° C. and held at that temperature for approximately one-half hour, then a crop of oxalic acid crystals is filtered out. Following this there is added to the mother liquor basic zinc carbonate equivalent to 15% of the total titratable acidity. This results in the precipitation of the remainder of the oxalic acid as zinc oxalate. After filtering off this precipitate a further quantity of basic zinc carbonate equivalent to one-half the original acidity should be added to precipitate zinc tartrates. Calculated as acids, yields based on weight of glucose fed in are 41.1% oxalic acid dihydrate and 26.5% tartaric acid. However, the mother liquor after precipitation contains partially oxidized material with some zinc. Preferably the zinc should be precipitated by addition of an equivalent amount of oxalic acid and is essentially removed from the solution by filtration of the resulting zinc oxalate. The filtrate from this salt is then evaporated in evaporator 59 to a residue containing approximately 80% solids and represents approximately 0.36 gram carbon per gram of original glucose carbon fed into chamber 14. It is stored in tank 62.

*Example 2*

In this example the same apparatus may be employed as in Example 1, but residue which was produced according to that example is used to provide part of the feed. In this way recovery of further product is obtained from the residue and it is not wasted. Also partially oxidized residue tempers the reaction of the readily oxidizable fresh carbohydrate material and aids greatly in control of the reaction. In this run 635.5 g. of glucose are fed into the system per hour along with enough residue to provide a residue carbon to glucose carbon ratio of 0.643. A smaller proportion of nitric acid is needed this time, since part of the feed has already been partially oxidized. Enough acid is added to provide 3.50 g. of nitric acid per gram of carbon feed. This acid is added diluted so that in the reaction mixture it amounts to 55% of the acid and water content. Again catalyst in an amount equal to 0.015% of the fresh glucose is added. This amounts to 0.095 g. per hour. The total feed comes to 2.7 liters per hour, of which 1.2 liters are water. Temperature conditions are maintained at the same values directed in Example 1, and the apparatus is operated in the same manner as in Example 1. The fume-off stages are operated for about half an hour to remove oxides of nitrogen. After fume-off the reacted solution contains about 36.6% water. The use of residue in the feed is reflected in higher yields. Oxalic acid and zinc oxalate calculated as oxalic acid dihydrate equivalent to 62.4% of the weight of glucose feed are obtained, while a yield equivalent to 40.8% tartaric acid is obtained. Also obtained is a further quantity of residue containing 0.643 g. of carbon per gram of carbon in the glucose fed in.

*Example 3*

This example shows a run made without the use of the concentrating tower. Conditions should be changed for this run; the temperatures are raised; flow is decreased; and the volumes in the first three chambers are increased to provide added time for the reaction. Glucose is fed in at the rate of 423.5 g. per hour along with enough residue from another run to provide 0.67 g. of residue carbon per gram of glucose carbon. Acid is fed in to provide 3.50 g. of $HNO_3$ per gram of total carbon and diluted to provide acid in the reaction mixture equivalent to 55% of the acid and water present. Catalyst also is fed in in an amount equal to 0.015% of the fresh glucose. This all amounts to a flow of 1.80 liters per hour. Chambers 14, 24, and 30 this time contain 2.70 liters each and are operated at 70, 85 and 99° C. respectively. Solution is then held in chamber 42 or chamber 43 for 34 minutes at 99° C. After fume-off the reacted solutions contain about 41.0% water. From this run is obtained product equivalent to about 38.6% of oxalic acid dihydrate, about 36.4% of tartaric acid, and a residue which contains 0.550 g. of carbon per gram of glucose carbon fed in. It may be seen that while yields without the concentrator are still high, the use of the concentrator improves them materially.

Continuous operation according to this disclosure proceeds smoothly with relatively constant conditions in each of the reaction chambers in the apparatus and a steady flow of oxides of nitrogen highly suitable for the nitric acid recovery equipment is obtained.

The method herein described is not limited to the apparatus indicated in the drawing, but other types of apparatus can readily be designed in which the steps may be performed.

By the term "tartaric acid" as used in the specification and claims is meant any of the three tartaric acids, d-, l-, and meso-tartaric acid.

What is claimed is:

1. A process for the preparation of tartaric and oxalic acid values which comprise adding to a reaction zone over an extended period of time, water, a residue of the type hereinafter described, nitric acid, carbohydrate material oxidizable in solution by nitric acid to tartaric acid and selected from the group consisting of glucose, fructose, pentoses, gluconic acid, erythritol, ketogluconic acids, and materials rapidly hydrolyzable to these, and a catalyst directive for tartaric acid preparation, maintaining said reaction zone at a temperature of not more than about 80° C. and maintaining the reactant proportions such that tartaric acid is formed, removing partially reacted liquor from said zone over an extended period of time and passing said partially reacted liquor through a concentrating zone wherein water is rapidly removed from said liquor by heating said liquor under conditions of high surface exposure and short contact time, passing the concentrated liquor into a zone maintained between about 90° C. and about 100° C. in which the reaction is completed, and then removing tartaric and oxalic acid from the reacted liquor, leaving a partially oxidized residue.

2. A process according to claim 1 in which the carbohydrate material is d-glucose and the catalyst is a soluble pentavalent vanadium compound.

RALPH A. HALES.

REFERENCES CITED

The following references are of record in the file of this patent:

UNITED STATES PATENTS

| Number | Name | Date |
| --- | --- | --- |
| 2,257,284 | Stokes et al. | Sept. 30, 1941 |
| 2,322,915 | Brooks | June 29, 1943 |
| 2,057,119 | Simpson | Oct. 13, 1936 |
| 1,520,885 | Rankin | Dec. 30, 1924 |
| 1,518,597 | Mittasch et al. | Dec. 9, 1924 |
| 1,425,605 | Odell | Aug. 15, 1922 |
| 1,157,348 | Portheim | Oct. 19, 1915 |
| 1,205,493 | Portheim | Nov. 21, 1916 |
| 1,816,137 | Acree | July 28, 1931 |
| 1,718,837 | Schorger | June 25, 1929 |